United States Patent
Watanabe (10) Patent No.: US 7,565,716 B2
(45) Date of Patent: Jul. 28, 2009

(54) CLEANING METHOD AND DEVICE FOR OBJECTIVE LENS OF OPTICAL DISC DEVICE

(75) Inventor: Yoji Watanabe, Chiba (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 11/118,348

(22) Filed: May 2, 2005

(65) Prior Publication Data
US 2006/0096059 A1 May 11, 2006

(30) Foreign Application Priority Data
May 12, 2004 (JP) ............................. 2004-142713

(51) Int. Cl.
*B08B 5/02* (2006.01)
(52) U.S. Cl. ..................... 15/300.1; 15/379; 15/405
(58) Field of Classification Search ............. 15/405; 369/71, 72; 134/184, 198
See application file for complete search history.

(56) References Cited

U.S. PATENT DOCUMENTS

| | | | | |
|---|---|---|---|---|
| 5,057,726 A | * | 10/1991 | Mole et al. ............... | 310/67 R |
| 5,088,082 A | * | 2/1992 | Yamada et al. ........... | 369/71 |
| 5,152,516 A | * | 10/1992 | Okayama et al. ......... | 271/3.13 |
| 6,625,110 B2 | * | 9/2003 | Kim et al. ............... | 369/300 |
| 2004/0245878 A1 | * | 12/2004 | Kim et al. ............... | 310/114 |

FOREIGN PATENT DOCUMENTS

| | | | |
|---|---|---|---|
| CN | 1093192 | * | 10/1994 |
| JP | 62-24448 | | 2/1987 |
| JP | 62-184637 | * | 8/1987 |
| JP | 3-58373 | * | 3/1991 |
| JP | 3-192578 | | 8/1991 |
| JP | 4-332923 | * | 11/1992 |
| JP | 9-282694 | | 10/1997 |
| JP | 2002-15447 | | 1/2002 |
| JP | 2002-92920 | * | 3/2002 |
| WO | WO 90/06576 | | 6/1990 |

* cited by examiner

*Primary Examiner*—Frankie L Stinson
(74) *Attorney, Agent, or Firm*—Oblon, Spivak, McClelland, Maier & Neustadt, P.C.

(57) ABSTRACT

A cleaning method for an objective lens of an optical disc device that rotatable drives an optical disc medium by a spindle motor and records and/or playbacks data to/from the optical disc medium by the objective lens of an optical-pick up, includes: an airflow generation mode for generating a high speed airflow at a surface of the optical disc medium by increasing a rotational speed of the spindle motor to be faster than a rotational speed during recording and/or playback of data to/from the optical disc medium; and a blow-off mode for blowing off dust attached to the surface of the objective lens by the high-speed airflow generated at the surface of the optical disc medium by moving the objective lens from the inner periphery of the optical disc medium to the outer periphery while vibrating the objective lens up and down and/or from the left to right.

13 Claims, 6 Drawing Sheets

DUST CONDITIONS

| DUST TYPE | JIS Z 8901,15 |
|---|---|
| DUST CONCENTRATION | 1.8mg/m³ OR MORE |
| DUST SUPPLY METHOD | FLOATING |

FIG. 6B

TEST RESULTS (0 SECOND HOLD VALUE, AVERAGE FOR FIVE TIMES)

| CLEANING TIME | 0 | 2 | 4 | 6 | 8 | 10 |
|---|---|---|---|---|---|---|
| RF SIGNAL PEAK HOLD VALUE | 24.6 | 65 | 81 | 99 | 102 | 98 |
| FIRST TIME | 25 | 65 | | | | |
| SECOND TIME | 29 | | 81 | 99 | | |
| THIRD TIME | 24 | | | | | |
| FOURTH TIME | 22 | | | | 102 | |
| FIFTH TIME | 23 | | | | | 98 |

FIG. 7

CLEANING TIME AND RF OUTPUT

CLEANING METHOD AND DEVICE FOR OBJECTIVE LENS OF OPTICAL DISC DEVICE

CROSS REFERENCE TO RELATED APPLICATIONS

The present invention contains subject matter related to Japanese Patent Application JP2004-142713, filed in the Japanese Patent Office on May 12, 2004, the entire contents of which being incorporated herein by reference.

BACKGROUND OF THE INVENTION

1. Field of the Invention

The present invention relates to a cleaning method and device for an objective lens of an optical pick-up of an optical disc device.

2. Description of Related Art

With optical disc devices that record or playback data to or from an optical disc medium such as an optical disc or magneto-optical disc etc. using an optical pick-up, if dust or tar from tobacco smoke etc. becomes attached to the surface of an objective lens of an optical pick-up and accumulated, transmissivity of an optical beam may deteriorate, which may be a substantial hindrance to the precision of recording (writing) and/or playback (reading) of data. This is particularly marked in optical disc devices for use with vehicles. It is therefore necessary for the surface of an objective lens of an optical pick-up of such optical disc device to be periodically cleaned.

When cleaning the surface of objective lenses of optical discs for playback use of CD's etc. of the related art, it has been necessary to use a commercial disc-type cleaner or to disassemble the optical disc device and then clean the pick-up. However, with optical disc devices for recording/playback such as DVD's, it is not possible to use a disc-type pick-up cleaner and it has therefore been necessary to disassemble a device at the time of cleaning.

In recent years, a method has been invented for periodically cleaning an objective lens where a cleaning disc with a cleaning brush (brush-filled) attached to a lower surface is loaded on a turntable and is rotatably driven by the turntable so that dust that has accumulated at the surface of the objective lens is removed by the cleaning brush of the cleaning disc (for example, Japanese Patent Application Publication No. 2002-92920).

Further, a cleaning method has also been invented where a cleaning brush is arranged midway in the path of an optical pick-up when the optical pick-up is going from the lower side to the upper side of an optical disc. The objective lens then comes into contact with the cleaning brush and dust that has accumulated at the surface of the objective lens is then cleaned off by the cleaning brush (for example, Japanese Patent Application Publication No. Hei. 06-111352).

Further, a lens cover having a large surface area may also be fitted in a freely rotating manner to the outer periphery of a rotating shaft of a spindle motor. At the time of recording/playback of an optical disc, a turntable is then rotatably driven in a predetermined direction by the rotating shaft of the spindle motor and the lens cover is rotated from a position covering the top of an objective lens to a retraction position so as to open up the objective lens. On the other hand, a method (for example, Japanese Patent Laid-open Publication No. 07-235074) has also been invented where the spindle motor is temporarily rotatably driven in a direction opposite to the predetermined direction after recording or playback of the optical disc. The lens cover is then rotated so as to go from the retraction position to the position covering the objective lens so as to make it difficult for dust to become attached to and accumulate at the surface of the objective lens.

However, cleaning methods for objective lenses using pick-up cleaners involve a great deal of work. Further, with methods of cleaning involving cleaning discs, cleaning brushes and lens covers etc or methods where dedicated mechanisms for dust-proofing use etc. are added, the number of parts and number of assembly steps increase, and this causes increase in cost of the optical devices. In particular, with the method where an objective lens is cleaned using a cleaning disc, it is necessary to load and unload a cleaning disc every time cleaning takes place, which is an extremely troublesome operation.

SUMMARY OF THE INVENTION

In order to ensure that cleaning of dust and tar from tobacco smoke etc. that has become attached to the surface of an objective lens can be achieved in a straightforward manner without using a pick-up cleaner or without newly adding a mechanism dedicated to cleaning of an objective lens, an objective lens cleaning method of an optical device of the present invention is provided with a mode for generating a high speed airflow at the surface of an optical disc medium by increasing rotational speed of a spindle motor to a rotational speed greater that the rotational speed at the time of recording of data to or playback of data from the optical disc medium, and a mode for blowing off dust attached to the surface of the objective lens by the high-speed airflow generated at the surface of the optical disc medium by moving the objective lens from the inner periphery of the optical disc medium to the outer periphery while vibrating the objective lens up and down and to the left and right. Further, the cleaning device for an objective lens of an optical disc device of the present invention is also provided with means for increasing rotational speed of the spindle motor to a speed greater than the rotational speed at the time of recording data to or playback data from the optical disc recording medium using key input and moving the objective lens from the inner periphery of the optical disc medium to the outer periphery while the objective lens is being vibrated up and down and from left to right by a twin-axial actuator.

The cleaning method and device for an objective lens of an optical disc device of the present invention rotatably drives an optical disc medium at high-speed so that dust and tar from tobacco smoke etc. at the surface of the objective lens is blown off by a high speed airflow generated at the surface of the optical disc medium. It is therefore possible to clean the objective lens in a straightforward manner without troublesome cleaning operations using pick-up cleaners being necessary, without it being necessary to add new mechanisms dedicated to cleaning or dust-proofing etc., and without increasing the number of parts of the number of assembly steps.

DESCRIPTION OF THE PREFERRED EMBODIMENTS

Automatic cleaning of an objective lens is implemented by providing a device which has read error detection means for detecting errors in reading data occurring during recording and/or playback of data for an optical disc medium, means for generating a high-speed airflow at the surface of the optical disc medium by increasing rotational speed of a spindle motor to be faster than the rotational speed during recording and/or playback of data of an optical disc medium using the read error detection means, and means for blowing off dust attached to the surface of the objective lens using a high-speed airflow generated at the surface of the optical disc medium by moving the objective lens from the inner periphery of the optical disc medium to the outer periphery while vibrating the objective lens up and down and to the left and right using a twin-axial actuator.

During this time, it is also preferable to have means for increasing the rotational speed of a spindle motor to faster than the rotational speed during recording and/or playback of data of an optical disc medium using an output from the read error detection means for detecting errors during recording and/or playback of data of the optical disc medium, and for moving the objective lens from the inner periphery of the optical disc medium to the outer periphery while vibrating the objective lens up and down and to the left and right using a twin-axial actuator.

First Embodiment

Figure 1:
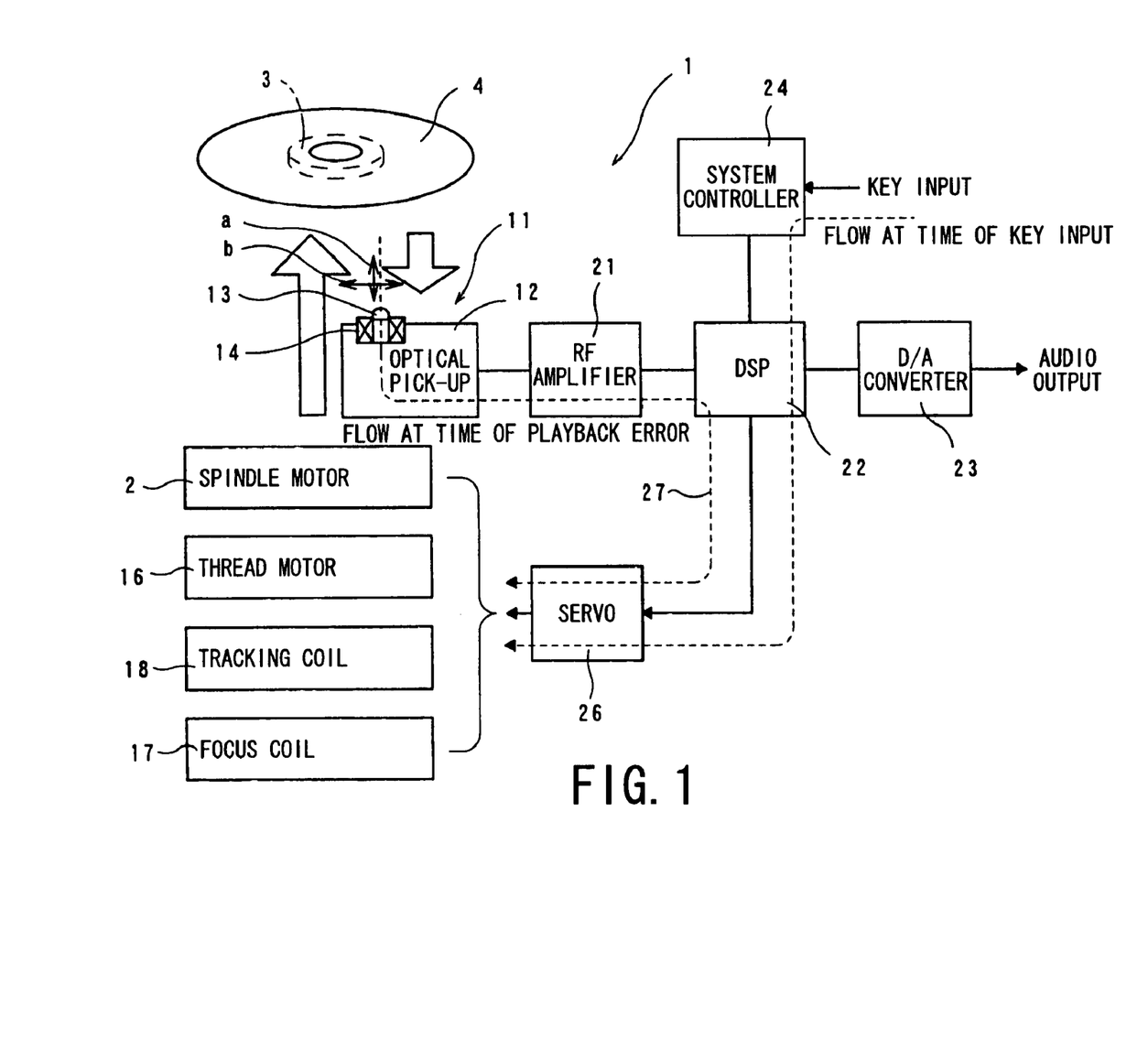
FIG. 1 is a system drawing illustrating a first embodiment of a cleaning method and device for an objective lens of an optical disc device of the present invention.
Figure 2:
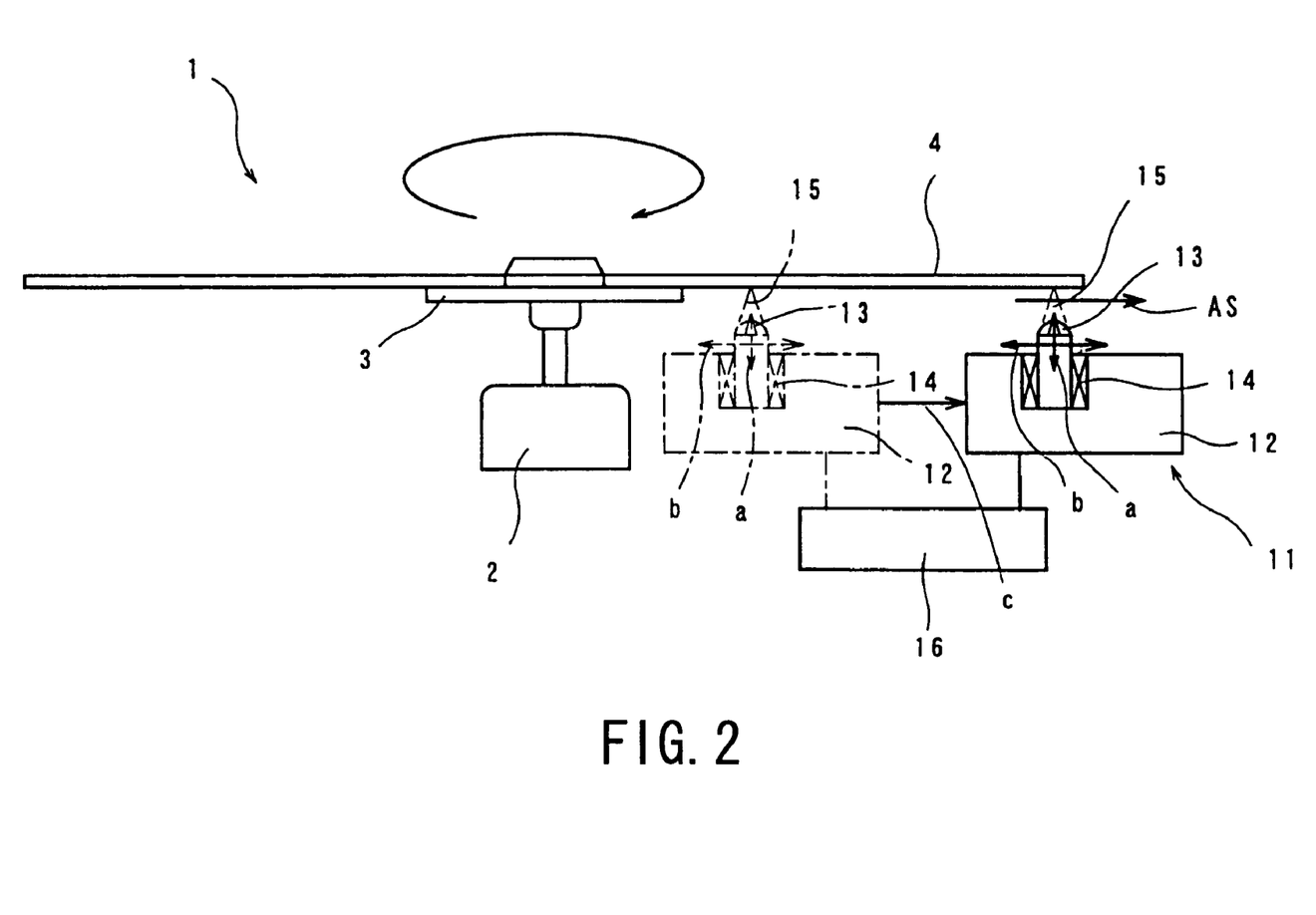
FIG. 2 is an outline side view showing an optical pick-up of the same.
Figure 3:
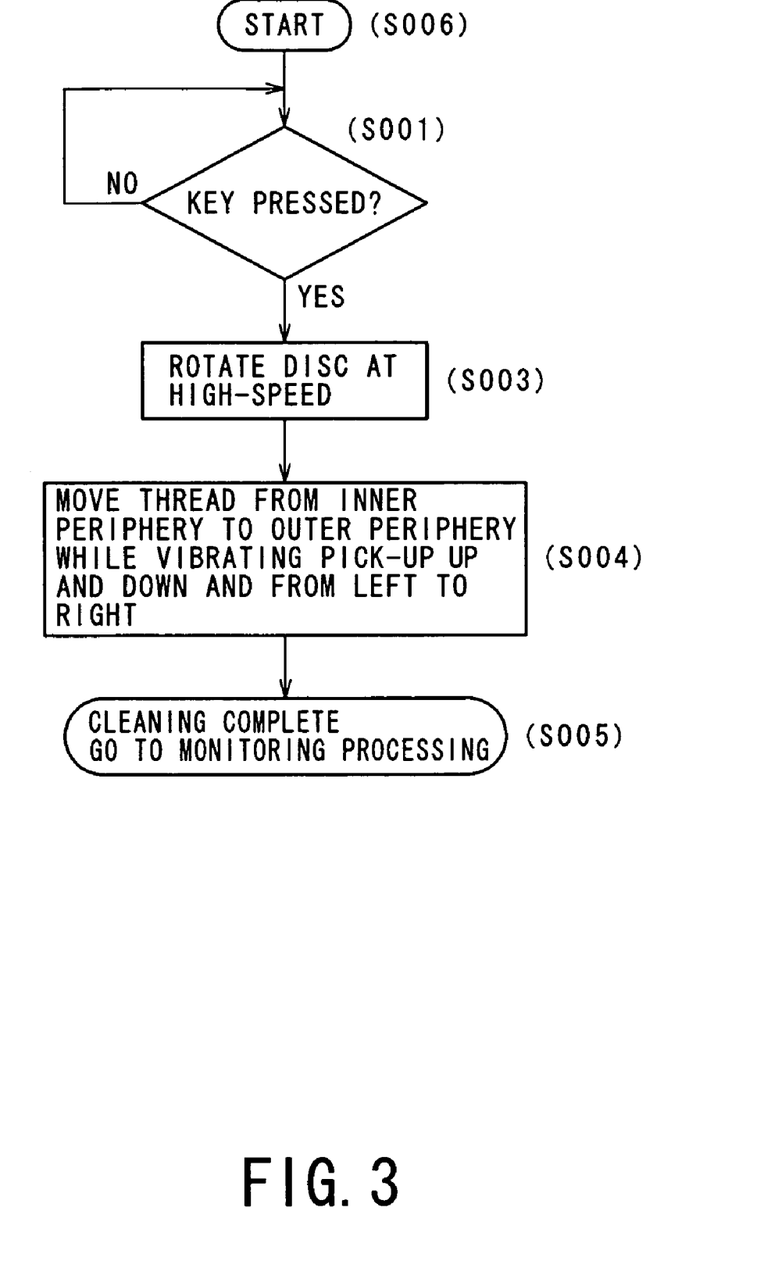
FIG. 3 is a flowchart illustrating a cleaning method and device cleaning operation for an objective lens of the same optical disc device.

FIG. 1 to FIG. 3 illustrate a first embodiment of a cleaning method and device for an objective lens of an optical disc device of the present invention. As shown in FIG. 1 and FIG. 2, a CD player 1, which is an example of an optical disc device, chucks a CD4, which is an optical disc medium, on a turntable 3 of a spindle motor 2. Further, an objective lens 13 is installed so as to be made to face upwards by a twin-axial actuator 14 at a thread 12 of the optical pick-up 11 and this objective lens 13 focuses a light beam 15 onto a lower surface of the CD4.

The thread 12 is moved in a radial direction of the CD4 using a thread motor 16, which is thread moving means, while rotatably driving the CD4 at a normal rotational speed using the spindle motor 2. The objective lens 13 is then driven (vibrated) in a vertical direction (direction of arrow a) and in a horizontal direction (direction of arrow b) by a focus coil 17 and tracking coil 18 of the twin-axial actuator 14, which is objective lens vibrating means. Focusing and tracking of the light beam 15 is then carried out and therefore playback (reading) of data (information) of the CD4 is carried out.

During this time, the rotational speed occurring at the time of normal playback of data of the CD4 is 500 rpm at the time of playback of the inner periphery and 200 rpm at the time of playback of the outer periphery.

As shown in FIG. 1, reflected light of the light beam 15 focused onto the CD4 by the objective lens 13 of the optical pick-up 11 is obtained as an audio output from an RF amplifier 21 via a DSP circuit 22 and a D/A converter 23. However, if dust or tar from tobacco smoke etc. becomes attached to a surface (upper surface) of the objective lens 13, a playback error (read error) occurs at the optical pick-up 11 and an audio output cannot be obtained.

A description is now given of the cleaning operation of the objective lens 13 of the first embodiment using FIG. 1 and FIG. 2 with reference to the flowchart of FIG. 3. When a playback error occurs, a signal is outputted to a system controller 24 from the RF amplifier 21, which is the read error detection means, via the DSP circuit 22. When a key input is carried out (S001), an instruction signal is outputted from the system controller 24, via the DSP circuit 22, to a servo circuit 26. In doing so, the servo circuit 26 increases the rotational speed of the spindle motor 2 to a rotational speed of, for example, 3800 rpm, that is higher than the rotational speed at the time of normal data playback, so as to enter a high-speed airflow generation mode (S003) where a high-speed airflow AS is generated as a result of rotatably driving CD4 at high speed.

Further, the servo circuit 25 drives the focus coil 17 and tracking coil 18 of the twin-axial actuator 14 of the optical pick-up 11 in a vibrating manner at, for example, the order of 100 Hz so that the thread motor 16 is driven while vibrating the objective lens 13 up and down, and to the left and right (direction of arrows a, b) so as to enter a blow-off mode where the objective lens 13 is moved in the direction of arrow c from the inner periphery of the CD4 to the outer periphery by the thread 12.

The speed of the airflow AS generated at the surface of the CD4 becomes faster towards the outer periphery side compared to the inner periphery side. Dust and tar from tobacco smoke etc. at the surface of the objective lens 13 is then automatically blown off by the high-speed airflow AS at the surface of CD4 while moving from the inner periphery to the outer periphery of the CD4 while vibrating the objective lens 13 up and down and to the left and right. This makes it possible to automatically clean the surface of the objective lens 13.

In this case, an appropriate time for cleaning is six to eight seconds. After this appropriate cleaning time has elapsed, key monitoring processing (S005) is carried out by the system controller 24 and the cleaning operation is complete. Further, in the event that there is no key input after the occurrence of a playback error, the system controller 24 awaits a key input (S006) and the cleaning operation described above is executed.

Second Embodiment

Figure 4:
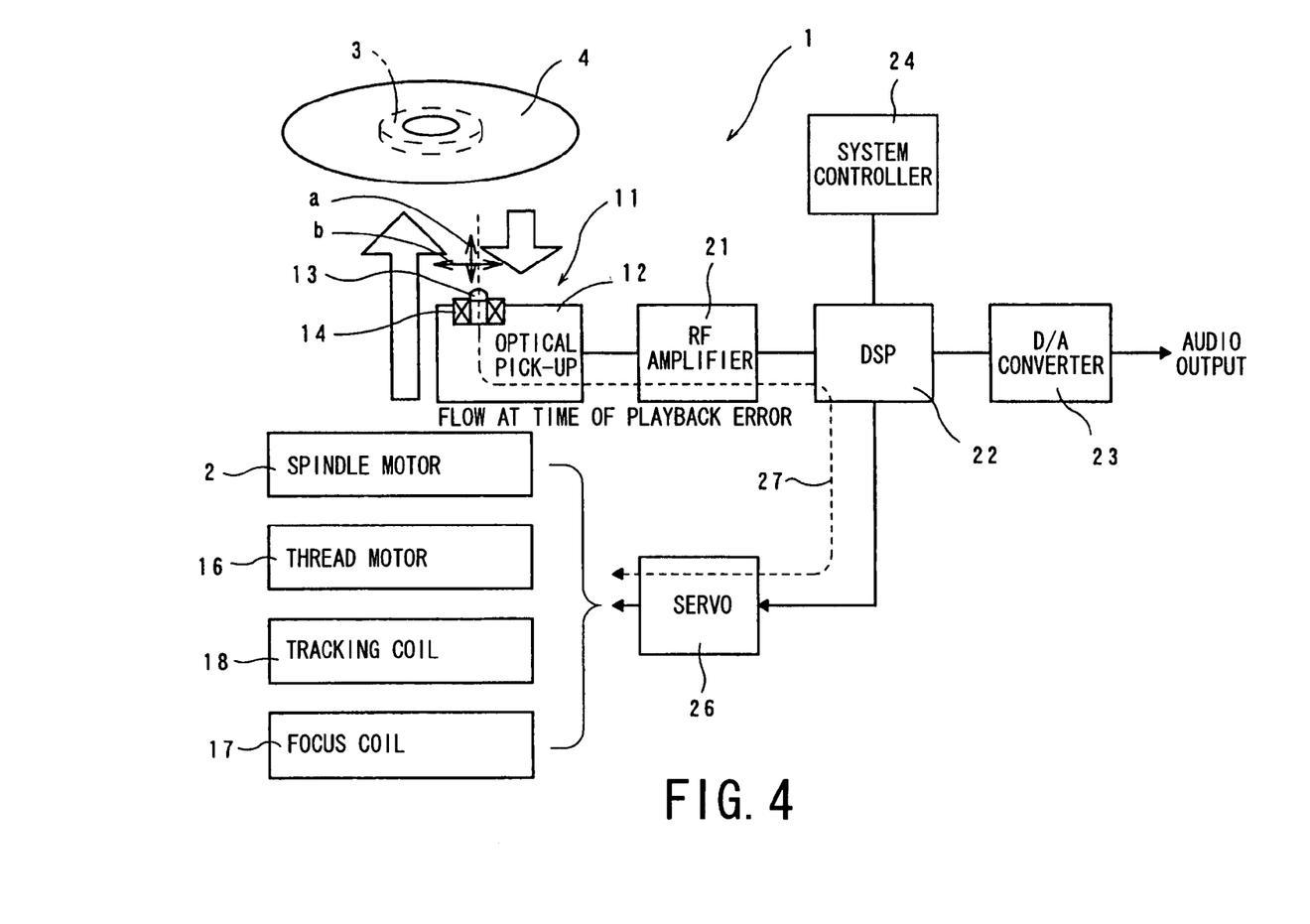
FIG. 4 is a system drawing illustrating a second embodiment of a cleaning method and device for an objective lens of an optical disc device of the present invention.
Figure 5:
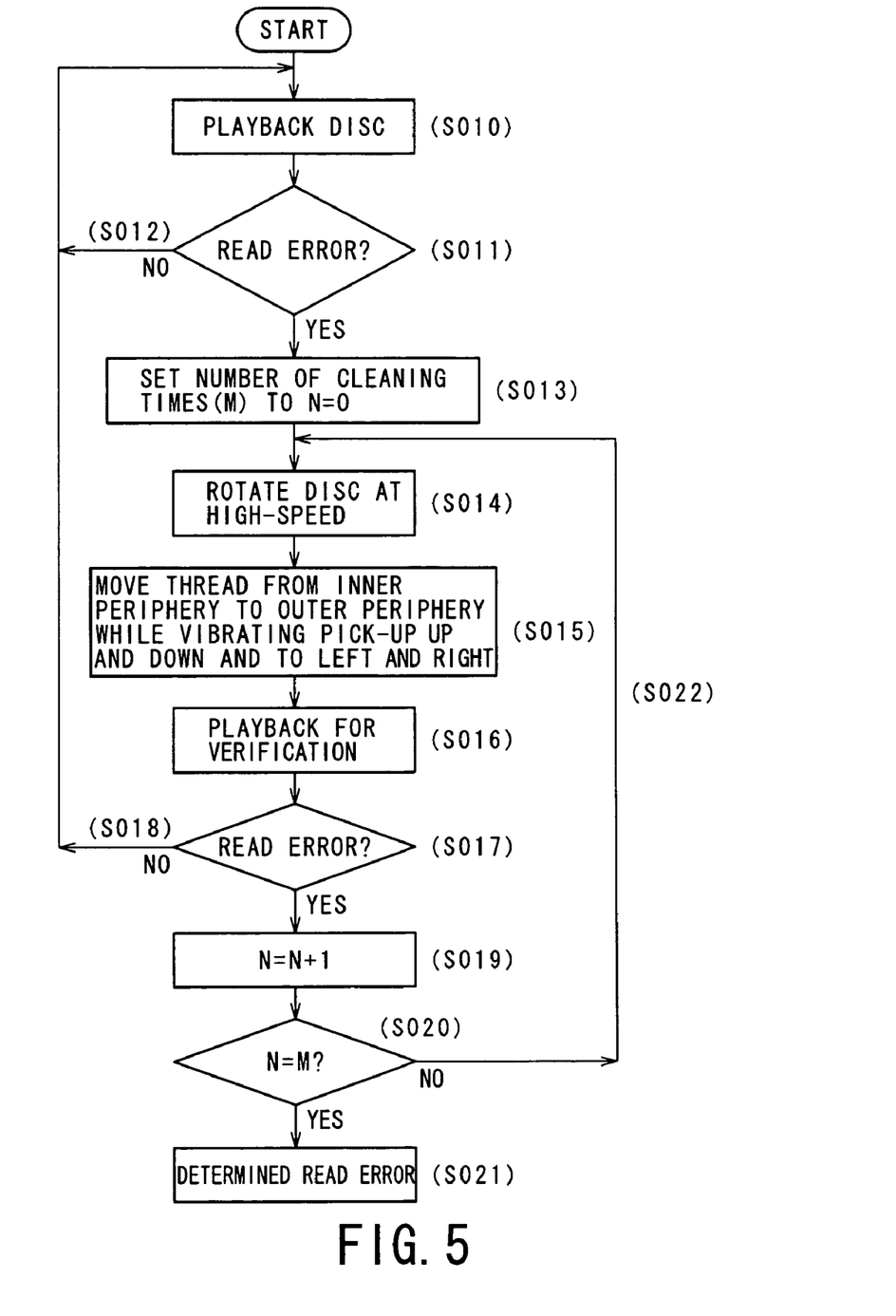
FIG. 5 is a flowchart illustrating a cleaning method and device cleaning operation for an objective lens of the same optical disc device.

Next, a description is given using FIG. 4 of a second embodiment for a cleaning method and device for an objective lens of an optical disc device while referring to the flowchart of FIG. 5. In this case, the presence or absence of the occurrence of a read error is monitored (S011) during playback of the CD4 (S010). If a read error does not occur (S012), playback of the CD4 continues as is. If a read error occurs, a cleaning instruction signal is outputted from the RF amplifier 21, which is the read error detection means, through the DSP circuit 22 and automatic cleaning circuit 27 to the servo circuit 26.

After that, the servo circuit 26 sets the number of cleaning times (M) to N times (S013) and rotates the CD4 at high-speed (S014) by rotatably driving the spindle motor 2 at high-speed The servo circuit 26 also executes a dust blow-off mode (015) by driving the thread motor 16 while vibrating the objective lens 13 up and down and from left to right (directions of arrows a, b) using the focus coil 17 and the tracking coil 18 so that the objective lens 13 is moved in the direction of arrow c from the inner periphery of the CD4 to the outer periphery by the thread 12 (S015). In doing so, as with the first embodiment described above, an automatic operation for cleaning dust and tar etc. at the surface of the objective lens 13 is executed.

Next, playback of the CD4 and count processing for the cleaning number for the CD4 are collated by verification playback (S016) and if there is no problem, monitoring of the presence or absence of the occurrence of a read error for the CD4 during playback is restarted (S017). If a read error does not occur (S018), playback of the CD4 is continued as is. If, even at this time, a read error does occur again, the cleaning is executed one more time (N+1) (S019). After the number of times of cleaning is determined whether or not N=M (S020), a read error is determined for the CD4 (S021), namely, it is determined that dust and tar etc. on the surface of the objective lens 13 cannot be removed even by automatic cleaning operations, whereby playback of the CD4 is stopped.

In the case where the number of times of cleaning is not executed correctly, the servo circuit 26 rotates the CD4 again at high-speed (S014), and enters the dust blow-off mode (S015) where the thread motor 16 is driven while the objective lens 13 is vibrated up and down and from left to right (direction of arrows a, b) by the focus coil 17 and the tracking coil 18 and the objective leans 13 is moved in a direction c from the inner periphery of the CD4 to the outer periphery by the thread 12. Further, in this flowchart, the setting for the number of times of cleaning may be decided by being input in advance, or may be set by being input on a case-by-case basis at the time of flow.

Figure 6A:
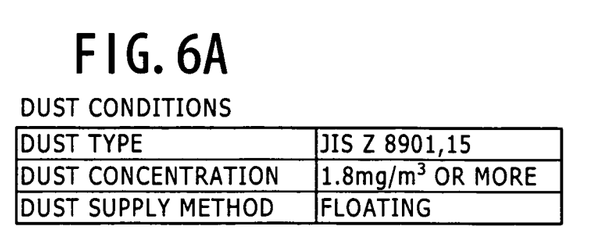
FIG. 6 is a table expressing dust conditions and test results when testing the relationship between, cleaning time and output of a cleaning method and device for the objective lens of an optical device of the present invention.
Figure 6B:
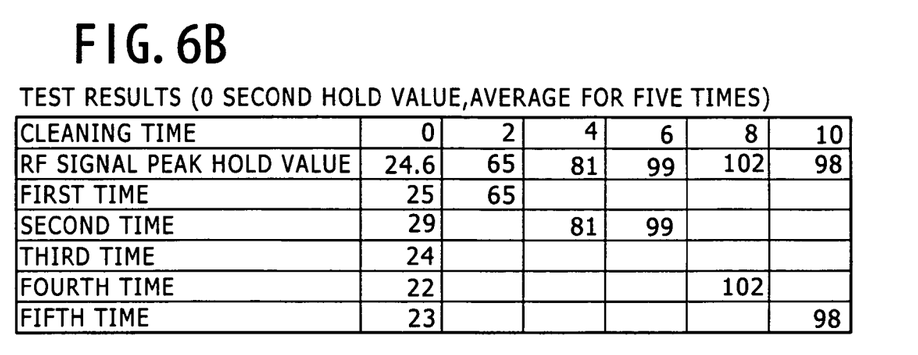
Figure 7:
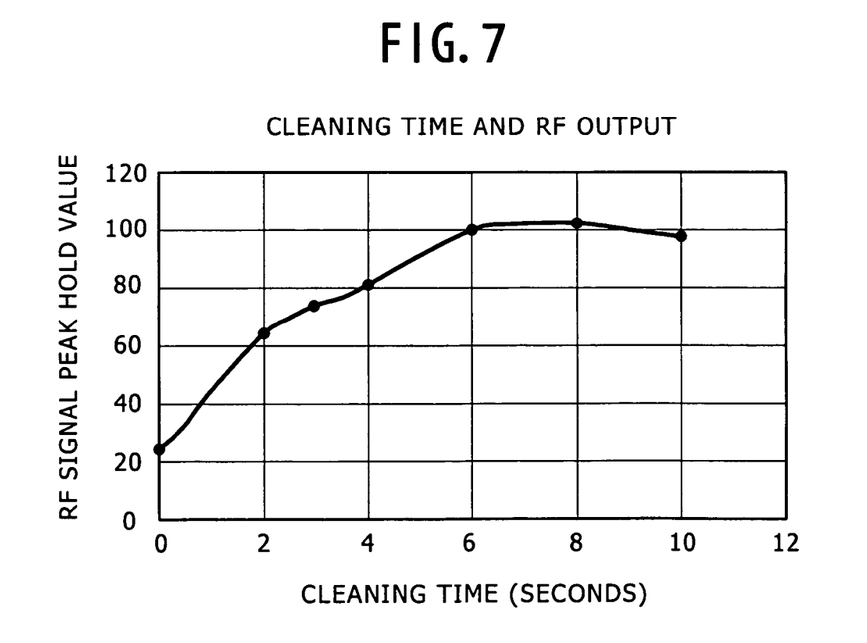
FIG. 7 is a graph showing the relationship between cleaning time and RF output of the same.

FIG. 6 and FIG. 7 show data at the time of an experiment for evaluating the relationship between the cleaning time and output of the objective lens 13 described above. The data shows a comparison of a peak-hold value for the RF signal of the CD and a peak-hold value after cleaning processing for N seconds in the event that the objective lens 13 was in a chamber in an exposed state for one hour. The dust conditions at this time are as in FIG. 6A and the test results are as in FIG. 6B. The relationship between cleaning time and RF output is shown in FIG. 7, with a value (100) satisfying the peak-hold value of the RF signal being reached in a cleaning time of approximately six to ten seconds.

Further, in these embodiments, a CD player is shown as an example of an optical disc device but the present invention may also be applied to various optical disc devices using various optical disc media such as DVDs and other optical discs or magneto-optical discs etc.

It should be understood by those skilled in the art that various modifications, combinations, sub-combinations and alterations may occur depending on design requirements and other factors insofar as they are within the scope of the appended claims or the equivalents thereof.

What is claimed is:

1. A drive device for an objective lens of an optical disc device that rotatably drives an optical disc medium by a spindle motor and records and/or playbacks data to/from the optical disc medium by the objective lens of an optical-pick up, comprising:

an error detection mechanism configured to detect a data error during playback and/or recording of data to the optical disc medium;

means for increasing a rotational speed of the spindle motor to be faster than a rotational speed during recording data and/or playback data to/from the optical disc recording medium in response to a data error detected by the error detection mechanism; and means for vibrating the objective lens up and down and/or from left to right by a twin-axial actuator adjacent to an outer periphery of the optical disc medium.

2. The drive device of claim 1, further comprising the twin-axial actuator.

3. The drive device of claim 1, further comprising a feedback mechanism configured to initiate a cleaning mode of operation in response to a detected read error.

4. A drive device for an objective lens of an optical disc device that rotatably drives an optical disc medium by a spindle motor and records and/or playbacks data to/from the optical disc medium by the objective lens of an optical-pick up, comprising:

error detection means for detecting a data error during recording and/or playback data to/from the optical disc medium;

airflow generation means for generating a high-speed airflow at a surface of the optical disc medium by increasing a rotational speed of the spindle motor to be faster than a rotational speed during recording and/or playback data to/from the optical disc medium in response to a detection result of the error detection means; and blow-off means for blowing off a contaminant attached to a surface of the objective lens using the high-speed airflow generated at the surface of the optical disc medium by moving the objective lens from the inner periphery of the optical disc medium to the outer periphery while vibrating the objective lens up and down and/or from left to right by a twin-axial actuator.

5. The drive device for an objective lens of an optical disc device according to claim 4, further comprising:

means for increasing a rotational speed of the spindle motor to be faster than a rotational speed during recording and/or playback data to/from the optical disc medium using the detection result output from the error detection means, and for moving the objective lens from the inner periphery of the optical disc medium to the outer periphery while vibrating the objective lens up and down and/or from left to right using a twin-axial actuator.

6. The drive device of claim 4, further comprising the twin-axial actuator.

7. The drive device of claim 4, further comprising a feedback mechanism configured to initiate a cleaning mode of operation in response to at least one of a detected read error and a key being pressed by an operator.

8. A drive device for an objective lens of an optical disc device that rotatably drives an optical disc medium by a spindle motor and records and/or playbacks data to/from the optical disc medium by the objective lens of an optical-pick up, comprising:

an error detection mechanism configured to detect a data error during playback and/or recording of data to the optical disc medium;

a mechanism configured to increase a rotational speed of the spindle motor to be faster than a rotational speed during recording data and/or playback data to/from the optical disc recording medium in response to a data error detected by the error detection mechanism, and configured to vibrate the objective lens up and down and/or from left to right by a twin-axial actuator adjacent to an outer periphery of the optical disc medium.

9. The drive device of claim 8, further comprising the twin-axial actuator.

10. The drive device of claim 8, further comprising a feedback mechanism configured to initiate a cleaning mode of operation in response to a detected read error.

11. A drive device for an objective lens of an optical disc device that rotatably drives an optical disc medium by a spindle motor and records and/or playbacks data to/from the optical disc medium by the objective lens of an optical-pickup, comprising:

an error detection mechanism configured to detect a data error during recording and/or playback data to/from the optical disc medium;

an airflow generation mechanism configured to generate a high-speed airflow at a surface of the optical disc medium by increasing a rotational speed of the spindle motor to be faster than a rotational speed during recording and/or playback data to/from the optical disc medium using a detection result of the error detection mechanism; and a blow-off mechanism configured to blow off a contaminant attached to a surface of the objective lens using the high-speed airflow generated at the surface of the optical disc medium by moving the objective lens from the inner periphery of the optical disc medium to the outer periphery while vibrating the objective lens up and down and/or from left to right by a twin-axial actuator.

12. The drive device of claim 11, further comprising the twin-axial actuator.

13. The drive device of claim 11, further comprising a feedback mechanism configured to initiate a cleaning mode of operation in response to at least one of a detected read error and a key being pressed by an operator.

* * * * *